United States Patent
Lawrence et al.

[11] Patent Number: 5,574,125
[45] Date of Patent: Nov. 12, 1996

[54] ENERGETIC NITRO PREPOLYMER

[75] Inventors: G. William Lawrence, Silver Spring; William H. Gilligan, Ft. Washington, both of Md.

[73] Assignee: The United States of America as represented by the Secretary of the Navy, Washington, D.C.

[21] Appl. No.: 754,897

[22] Filed: May 23, 1985

[51] Int. Cl.$^6$ .................................................. C08G 18/44
[52] U.S. Cl. .......................... 528/66; 528/196; 528/271; 149/88
[58] Field of Search ................ 149/88; 528/66, 528/196, 271

[56] References Cited

U.S. PATENT DOCUMENTS

| | | | |
|---|---|---|---|
| 3,306,939 | 2/1967 | Hill | 149/88 |
| 3,388,147 | 6/1968 | Kamlet et al. | 149/88 |
| 4,141,768 | 2/1979 | Lo et al. | 149/19.6 |
| 4,323,518 | 4/1982 | Gilligan | 149/88 |
| 4,411,837 | 10/1983 | Gilligan et al. | 149/88 |
| 4,449,000 | 5/1984 | Sitzmann et al. | 149/88 |
| 4,499,309 | 2/1985 | Sitzmann et al. | 149/88 |

*Primary Examiner*—Charles T. Jordan
*Assistant Examiner*—John R. Hardee
*Attorney, Agent, or Firm*—John Forrest; Roger D. Johnson

[57] ABSTRACT

Hydroxy-terminated poly(2,2-dinitropropyl)polynitroorthocarbonate prepolymers of the formula

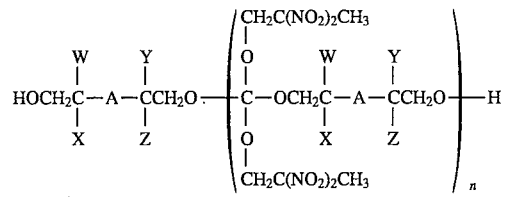

which are prepared by reacting bis(2,2-dinitropropyl)dichloroformal with a diol of the formula

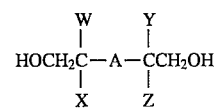

wherein n>1, and wherein W, X, Y, and Z vary independently and are F or $NO_2$, and wherein —A— is —$CH_2$—, —$CH_2CH_2$—, —$CH_2CH_2CH_2$—, —$CF_2$—, —$CF_2CF_2$—, —$CF_2CF_2CF_2$—, —$CF_2CF_2CF_2CF_2$—, —$CH_2OCH_2$—, —$CH_2OCH_2OCH_2$—, —$CH_2OCF_2OCH_2$—, or —$CH_2N(NO_2)CH_2$—. These prepolymers are reacted with curing agents (e.g., polyisocyanates) to form energetic polymeric binders.

6 Claims, No Drawings

ENERGETIC NITRO PREPOLYMER

BACKGROUND OF THE INVENTION

This invention relates to polymers and more particularly to energetic polymers which are useful as binders in propellants and explosives.

At the present time non-energetic binders are used for propellants and explosives. Energetic plasticizers are frequently combined with these binders to increase the energy. Unfortunately, the amounts of energetic plasticizers needed result in reductions in important properties such as tensile strength and elongation.

It would be desirable therefore to reduce the amounts of energetic plasticizers needed in explosive and propellant binders and thus improve physical properties such as tensile strength and elongation.

SUMMARY OF THE INVENTION

Accordingly, an object of this invention is to provide new prepolymers and polymers.

Another object of this invention is to provide new high energy prepolymers and polymers A further object of this invention is to provide means of increasing the energy content of binders without sacrificing tensile strength and elongation.

Yet another object of this invention is to provide a new method of synthesizing energetic prepolymers and polymers.

These and other objects of this invention are achieved by providing a hydroxy-terminated poly(2,2-dinitropropyl)polynitroorthocarbonate prepolymer of the formula:

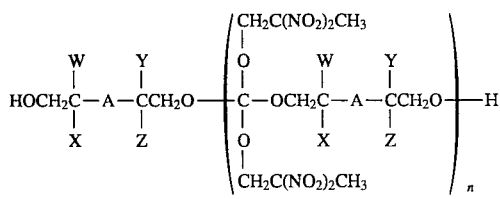

which can be prepared by reacting bis(2,2-dinitropropyl)dichloroformal with an alcohol of the general formula:

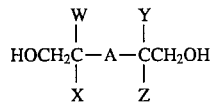

wherein n>1, and wherein W, X, Y, and Z vary independently and are $NO_2$ or F and —A— is —$CH_2$—, —$CH_2CH_2$—, —$CH_2CH_2CH_2$—, —$CF_2$—, —$CF_2CF_2$—, —$CF_2CF_2CF_2$—, $CF_2CF_2CF_2CF_2$—, —$CH_2OCH_2$—, —$CH_2OCH_2OCH_2$—, —$CH_2OCF_2OCH_2$—, or —$CH_2N(NO_2)CH_2$—.

These hydroxy-terminated poly(2,2-dinitropropyl)polynitroorthocarbonate prepolymers may be reacted with curing agents (e.g., polyisocyanates) to produce energetic polymeric binders for explosives and propellants.

DETAILED DESCRIPTION OF THE PREFERRED EMBODIMENT

The prepolymers of the present invention are energetic hydroxy-terminated poly(2,2-dinitropropyl)polynitroorthocarbonates of the general formula

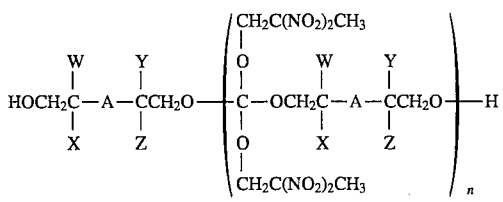

which are prepared by reacting bis(2,2-dinitropropyl)dichloroformal with a diol of the formula

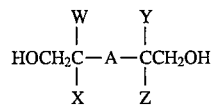

wherein n>1, and wherein W, X, Y, and Z vary independently and are each F or $NO_2$, and A represents a stable, nonreactive, preferable energetic linkage which will be described later. It is critical for the formation of stable polyorthocarbonates that W, X, Y, and Z each be a very strong electronegative fluoro or nitro group. In other words, the carbon atom beta to the terminal hydroxy group must contain two of these strongly electronegative groups. Specifically, the diols used in this invention must contain only —$CF_2CH_2OH$, —$CF(NO_2)CH_2OH$, and —$C(NO_2)_2CH_2OH$ end groups. Preferably, the two end Groups on the diol are identical (W=Y and X=Z) and the hydroxy-terminated poly(2,2-dinitropropyl)polynitroorthocarbonate will have the general formula

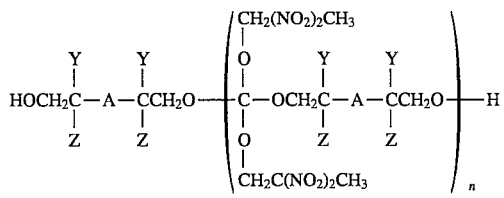

and the corresponding diol the general formula

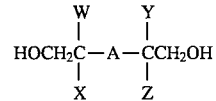

wherein n>1, and wherein Y and Z vary independently and are each F or $NO_2$.

As stated before, —A— may represent a number of linkages provided that they are stable and nonreactive under the conditions of the polymerization process. For example, —A— may contain —$CH_2$—, —CHF—, —$CF_2$—, —$CH(NO_2)$—, or —$C(NO_2)_2$—. —A— may also contain oxygen in the form of ether (e.g., —$CH_2OCH_2$—, —$CF_2OCF_2$—, etc.) or formal (e.g. —$CH_2OCH_2$—, —$CH_2OCF_2OCH_2$—, etc.) units. Obviously, unstable oxygen groups such as peroxides (—$CH_2$—O—O—$CH_2$—) are excluded. Oxygen in a reactive form such as —CH(OH)— is also excluded from —A—. Additionally, nitrogen may be present in the backbone of —A—. However, —NH— contains a reactive hydrogen and therefore is not desirable; on the other hand —$N(NO_2)$— is stable, energetic, and nonreactive and therefore suitable.

The following are examples of the diols which may be reacted with bis(2,2-dinitropropyl)dichloroformal to form the hydroxy-terminated poly(2,2-dinitropropyl)polynitropolyorthocarbonate prepolymers in this invention:

HOCH$_2$C(NO$_2$)$_2$CH$_2$OCH$_2$OCH$_2$C(NO$_2$)$_2$CH$_2$OH,
HOCH$_2$CF(NO$_2$)CH$_2$OCH$_2$OCH$_2$CF(NO$_2$)CH$_2$OH,
HOCH$_2$C(NO$_2$)$_2$CH$_2$OCF$_2$OCH$_2$C(NO$_2$)$_2$CH$_2$OH,
HOCH$_2$C(NO$_2$)$_2$CH$_2$C(NO$_2$)$_2$CH$_2$OH,
HOCH$_2$C(NO$_2$)$_2$CH$_2$CH$_2$C(NO$_2$)$_2$CH$_2$OH,
HOCH$_2$C(NO$_2$)$_2$CH$_2$CH$_2$CH$_2$(NO$_2$)$_2$CH$_2$OH,
HOCH$_2$C(NO$_2$)$_2$CH$_2$OCH$_2$C(NO$_2$)$_2$CH$_2$OH
HOCH$_2$C(NO$_2$)$_2$CH$_2$N(NO$_2$)CH$_2$C(NO$_2$)$_2$CH$_2$OH,
HOCH$_2$CF$_2$CF$_2$CF$_2$CH$_2$OH, and
HOCH$_2$CF$_2$CF$_2$CF$_2$CF$_2$CH$_2$OH.

Note that long hydrocarbon chains, —(CH$_2$)$_n$—, are undesirable because they substantially reduce the energy content of the polymer. On the other hand, polyfluorohydrocarbon and polynitrohydrocarbon chains are preferred because of their energy content.

Note that the —A— linkage in the diols is preferably a straight chain as this will produce a more flexible propellant binder.

Equimolar amounts of the diol and bis(2,2-dinitropropyl)dichloroformal can be used, but preferably an excess of the diol is used to assure that the prepolymer product will be hydroxy-terminated. The molar ratio of diol to the dichloroformal is from 1:1 to 2:1 or preferably from 1.33:1 to 1.50:1.

Preferably the average molecular weight of the hydroxy-terminated poly(2,2-dinitropropyl)polynitroorthocarbonate prepolymer is from 1,000 to 10,000. As the molar ratio of diol to bis(2,2-dinitropropyl)dichloroformal is increased, the average molecular weight of the prepolymer produced decreases.

The reaction between a diol and the bis(2,2-dinitropropyl)dichloroformal can be run without a solvent by melting the starting materials. However, it is safer and thus preferable to use a solvent. Preferred among the solvents are the chlorohydrocarbons such as methylene chloride, 1,2-dichloroethane 1,1,1-trichloroethane, 1,1,2-trichloroethane, 1,1,2,2,-tetrachloroethane, and chloroform, with chloroform being the preferred solvent. Nitromethane also can be used as the solvent.

The reaction temperature is preferably from about 40° C. to about 100° C. and more preferably from about 50° C. to 60° C.

Preferably a rapid stream of dry nitrogen is passed through the reaction mixture to remove hydrogen chloride which is generated by the reaction between the diol and bis(2,2-dinitropropyl)dichloroformal. It is advantageous to collect and titrate the evolved hydrogen chloride to determine and confirm the extent of reaction.

Crude poly(2,2-dinitropropyl)polynitroorthocarbonate material is obtained either by solvent evaporation or by decantation of the supernatant liquid from the cooled reaction mixture. Purified material is obtained by extracting the low molecular weight impurities from the crude material with suitable solvents and/or solvent combinations. For example, chloroform or mixture of a few percent (~2%) of methanol in chloroform will work.

The purified hydroxy-terminated poly(2,2-dinitropropyl)polynitroorthocarbonate prepolymers can be reacted with suitable materials to produce energetic, plastic binders for explosives and propellants. As illustrated by Examples 3 and 5, these prepolymers may be cured with polyisocyanates to produce rubbery polymers. Organic diisocyanates which may be used in this invention include aromatic, aliphatic and cycloaliphatic diisocyanates, as for example: 2,4-toluene diisocyanate, 2,6-toluene diisocyanate, p-phenylene diisocyanate, 1,5-naphthylene diisocyanate, 4,4'-biphenylene diisocyanate, p,p'-methylene diphenyl diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-cyclohexyl isocyanate, 1,5-tetrahydronaphthylene diisocyanate, polymethylenepolyphenylisocyanate (PAPI), isophorone diisocyanate, and N,N',N'', trisisocyanatohexylbiuret. Mixtures of diisocyanates may also be used. Preferred polyisocyanates are 2,4-toluene diisocyanate, 2,6-toluene diisocyanate, polymethylenepolyphenylisocyanate (PAPI), and N,N',N''-trisisocyanatohexylbiuret. The polyisocyanate is used in an amount sufficient to supply from about 0.8 to about 1.5, but preferably from 1.0 to 1.2 isocyanate functional groups for each hydroxy functional group.

The general nature of the invention having been set forth, the following examples are presented as specific illustrations thereof. It will be understood that the invention is not limited to these examples but is susceptible to various modifications that will be recognized by one of ordinary skill in the art.

EXAMPLES

Example 1 illustrates a method by which the bis(2,2-dinitropropyl)dichloroformal starting material can be prepared. This example is taken from U.S. patent application Ser. No. 256,462 which was filed on Mar. 30, 1981, by William H. Gilligan and which now is under a D-10 order.

Example 1

Bis(2,2-dinitropropyl)dichloroformal

Gaseous chlorine was passed into a solution of 3.1 g (9.1 mmol) of bis(2,2-dinitropropyl)thionocarbonate in 7 ml of acetonitrile/1,2-dichloroethane mixture (¾; v/v) for 5 ½ hours. After standing overnight, the solvents were removed and the solid residue recrystallized from 1,2-dichloroethane to give 3.2 g (93%) of product, m.p. 121°–3° C. H-NMR (acetone-Cl$_6$/TMS δ (ppm)—s, 5.04; s, 2.39 Calc for C$_7$H$_{10}$N$_4$O$_{10}$Cl$_2$. C, 22.06; H, 2.65; Cl, 18.61. Found: C, 22.30; H, 2.68; Cl, 18.28

The bis(2,2-dinitropropyl)thiocarbonate used in Example 1 is prepared according to a method disclosed in Example 1 of U.S. Pat. No. 4,323,518, entitled "Polynitroethylthiocarbonates and Method of Preparation", which issued on Apr. 6, 1982, to William H. Gilligan, herein. incorporated by reference.

Examples 2–5 illustrate the preparation of prepolymers and their polymerization to form gumstocks.

Example 2

To a flask equipped with a nitrogen inlet, a motor-driven stirrer and an insulated spiral condenser at −30° C. was added 76 ml of ethanol-free chloroform. After placing the flask in a 55° C. oil bath, 41.15 g (0.108 mol) of bis(2,2-dinitropropyl)dichloroformal and 43.36 g (0.126 mol) of 2,2,8,8-tetranitro-4,6-dioxanonane-1,9-diol were added. A steady stream of nitrogen was passed through the solution during the course of the reaction. After 5 hours at 55° C., 100.3% of the theoretical amount of hydrogen chloride had been collected. The reaction mixture was then cooled and the upper layer of chloroform was removed by decantation. The bottom layer containing the polymer was washed four times with 70 ml of chloroform by heating to 55° C. for several hours with efficient stirring, then cooling the mixture and removing the chloroform by decantation. After washing, the residual solvent was removed in vacuo to give, after grinding a white powder. Analysis by gel permeation chromatography gave the following values: weight average molecular weight, 4477; number average molecular weight, 2896; dispersity, 1.55 and functionality, 1.99.

Example 3

The polymer (5.00 g, 4.55 me) and 0.2 g of trimethylolpropane were dissolved in 7.58 g of bis(2-fluoro-2,2-dinitroethyl)formal at 60° C. The solution was then degassed under vacuum overnight. Toluenediisocyanate (0.79 g) and 0.23 g of dibutyl tin dilaurate were added and the mixture was cured at 60° C. under vacuum for 72 hours to form a clear rubbery gumstock.

Example 4

2,2,8,8-tetranitro-4,6-dioxanonane-1,9-diol (103.2 g, 0.30 mol) was dissolved in 190 ml ethanol-free chloroform at 55° C. in a resin flask equipped with a nitrogen inlet, a motor-driven stirrer and an insulated spiral condenser at −35°. Then 91.50 g (0.24 mol) of bis(2,2-dinitropropyl)dichloroformal was added and the stirred reaction mixture was held at 55° C. for 7 hours while a steady stream of nitrogen was passed through the mixture. The reaction mixture was cooled and the upper layer of chloroform was removed by decantation. The lower layer containing the polymer was extracted four times with 100 ml of chloroform (vide supra). The residual solvent was removed in vacuo and the solid polymer was powdered. Analysis gave the following values: weight average molecular weight, 3870; number average molecular weight, 2621; dispersity, 1.48 and functionality, 1.96.

Example 5

The polymer produced in Example 4 (3.00 g) was dissolved in 3.30 g of bis(2-fluoro-2,2-dinitroethyl)formal at 70° C. and degassed for 5 hours. Then 0.157 g of an aromatic polyfunctional isocyanate (functionality of 2.7; tradename: PAPI 135, Upjohn Company), 0.094 g of toluenediisocyanate and 0.05 g of dibutyl tin dilaurate were added. After degassing at ambient temperature, the mixture was cured at 600° C. for 24 hours to form a rubbery gumstock with good elasticity.

Example 6

This example shows how the molecular weight and functionality of the prepolymers can be varied by varying the reaction conditions. These conditions include the molar ratio of bis(2,2,-dinitropropy)dichloroformal (DCF) to 2,2,8,8-tetranitro-4,6-diaxanonane-1,9-diol (DINOL) and the reaction solvent, temperature, and time.

| Reaction Conditions versus Functionality (U) | | | | | | | |
|---|---|---|---|---|---|---|---|
| Run | Molar Ratio | React Conditions | | | | | |
| No. | DCF/DINSOL | Solv, | Temp, Time | $MW_n$ | $MW_w$ | Dispersity | F |
| 1 | 5/6 | $CH_2ClCH_2Cl$ | 65°, 6 hr | 4643 | 9549 | 2.06 | 1.60 |
| 2 | 5/6 | $CH_2ClCH_2Cl$ | 55°, 7 hr | 4346 | 7530 | 1.73 | 1.42 |
| 5 | 5/6 | $CH_2ClCH_2Cl$ | 55°, 7 hr | 3746 | 5963 | 1.59 | 1.78 |
| | | Nitrogen Sweep | | | | | |
| 3[a] | 5/6 | $CHCl_3$, | 50°, 6 hr | 3793 | 6927 | 1.83 | 1.92 |
| 6[a] | 5/6 | $CHCl_3$, | 55°, 6 hr | 3979 | 7778 | 1.95 | 2.03 |
| 7[a] | 3/4 | $CHCl_3$, | 45°, 7 hr | 2911 | 4957 | 1.70 | 1.86 |
| 8[a] | 3/4 | $CHCl_3$, | 62°, 3 hr | 3278 | 7994 | 2.44 | 2.25 |
| 9[a] | 4/5 | $CHCl_3$, | 55°, 7 hr | 2621 | 3870 | 1.48 | 1.96 |
| | | Nitrogen Sweep | | | | | |
| 11[a] | 5/6 | $CHCl_3$, | 55°, 6 hr | 3585 | 5113 | 1.43 | 1.84 |
| 12[a] | 6/7 | $CHCl_3$, | 55°, 5 hr | 2896 | 4477 | 1.55 | 1.99 |
| | | Nitrogen Sweep | | | | | |

[a] Forms two phases within 30–45 minutes of reaction onset. Dispersity = $MW_w/MW_n$.

PROPERTIES OF BIS(DINITROPROPYL)DICHLOROFORMAL/DINOL PREPOLYMER

Appearance: White Powder
Melting Range: 50° to 80°
Impact Sensitivity: 50 cm
Vacuum Thermal Stability: 0.36 cc/gm: 100° C., 48 hrs
DSC (10° /min): 270°
Density: 1.584 g/cc
Heat of Formation: −523 cal/g
Calculated Detonation Pressure (KSM): 228 kBar
Electrostatic Sensivity: >12.5 Joules
Sliding Friction: >960 ft-lbs.

Obviously many modifications and variations of the present invention are possible in the light of the above teachings. It is therefore to understood that within the scope of the appended claims the invention may be practiced otherwise than as specifically described.

What is claimed and desired to be secured by Letters Patent of the United States is:

1. A hydroxy-terminated poly(2,2-dinitropropyl)polynitroorthocarbonate prepolymer of the formula

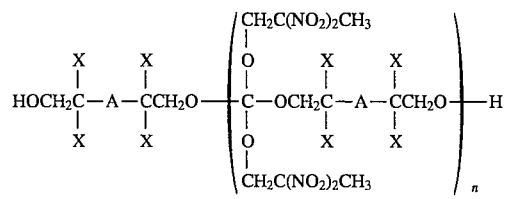

where n>1, X is selected from the group consisting of F and $NO_2$, and wherein when X is F, —A— is selected from the group consisting of —$CF_2$—, —$CF_2CF_2$—, —$CF_2CF_2CF_2$—, and —$CF_2CF_2CF_2CF_2$—, but when X is $NO_2$, —A— is selected from the group consisting of —$CH_2CH_2$—, —$CH_2OCH_2$—, and —$CH_2OCH_2OCH_2$—.

2. A polynitroorthocarbonate prepolymer according to claim 1 which has an average molecular weight of from 1,000 to 10,000.

3. A polynitroorthocarbonate prepolymer according to claim 1 wherein X is F and —A— is selected from the group consisting of —$CF_2$—, —$CF_2CF_2$—, —$CF_2CF_2CF_2$—, and —$CF_2CF_2CF_2CF_2$—.

4. A polynitroorthocarbonate prepolymer according to claim 3 wherein —A— is selected from the group consisting of —$CF_2$—and —$CF_2CF_2$—.

5. A polynitroorthocarbonate prepolymer according to claim 1 wherein X is $NO_2$ and —A— is selected from the group consisting of —$CH_2CH_2$—, —$CH_2OCH_2$—, and —$CH_2OCH_2OCH_2$—.

6. A polynitroorthocarbonate prepolymer according to claim 5 wherein —A— is —$CH_2OCH_2OCH_2$—.

\* \* \* \* \*